United States Patent [19]
Schoettl

[11] Patent Number: 5,977,852
[45] Date of Patent: *Nov. 2, 1999

[54] VALVE CONTROL DEVICE FOR CONTROLLING A VALVE FOR A PRESSURE FLUID

[75] Inventor: Johannes Schoettl, Woerth, Germany

[73] Assignee: Siemens Aktiengesellschaft, Munich, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/706,610

[22] Filed: Sep. 5, 1996

[30] Foreign Application Priority Data

Sep. 5, 1995 [DE] Germany .............................. 195 32 763

[51] Int. Cl.$^6$ .............................. H01H 7/00; B60T 8/36
[52] U.S. Cl. .......................... 335/278; 335/298; 336/90; 336/192
[58] Field of Search ................................ 335/202, 278, 335/296, 299, 282; 336/90, 96, 107, 192; 303/119.2; 178/46

[56] References Cited

U.S. PATENT DOCUMENTS

| 3,691,294 | 9/1972 | Charles ....................................... 178/46 |
| 4,172,964 | 10/1979 | Reinebach ................................. 178/46 |
| 4,679,767 | 7/1987 | Vollmer et al. ..................... 251/129.15 |
| 5,038,125 | 8/1991 | Vogel ....................................... 335/202 |
| 5,386,337 | 1/1995 | Schoettl .................................. 361/622 |
| 5,482,362 | 1/1996 | Robinson .............................. 303/119.2 |

FOREIGN PATENT DOCUMENTS

| 268996 | 4/1964 | Australia . |
| 20 02 233 | 6/1971 | Germany . |
| 21 24 297 | 11/1972 | Germany . |
| 43 10 960 | 10/1993 | Germany . |
| 42 32 205 | 3/1994 | Germany . |

Primary Examiner—Michael L. Gellner
Assistant Examiner—Raymond M. Barrera
Attorney, Agent, or Firm—Herbert L. Lerner; Laurence A. Greenberg

[57] ABSTRACT

A valve control device for controlling a valve for a pressure fluid includes a cylindrical coil having a longitudinal extent defining a longitudinal axis, an end surface, a coil body with a terminal pin carrier disposed on the end surface, and a coil wire wound onto the coil body. Coil terminal pins are oriented crosswise to the longitudinal axis of the coil, are secured to the terminal pin carrier and are electrically conductively connected to the coil wire. A yoke ring housing includes a yoke ring sheath surrounding the longitudinal extent of the coil and having a longitudinal extent. The yoke ring sheath has an opening formed therein in the form of a gap piercing the full longitudinal extent of the yoke ring sheath for accommodating a terminal. A housing wall faces toward the end surface of the coil and a fastening element secures the yoke ring housing on the housing wall. The structural height of the valve control device is reduced by extending the coil terminal pins laterally out of the yoke ring housing.

8 Claims, 4 Drawing Sheets

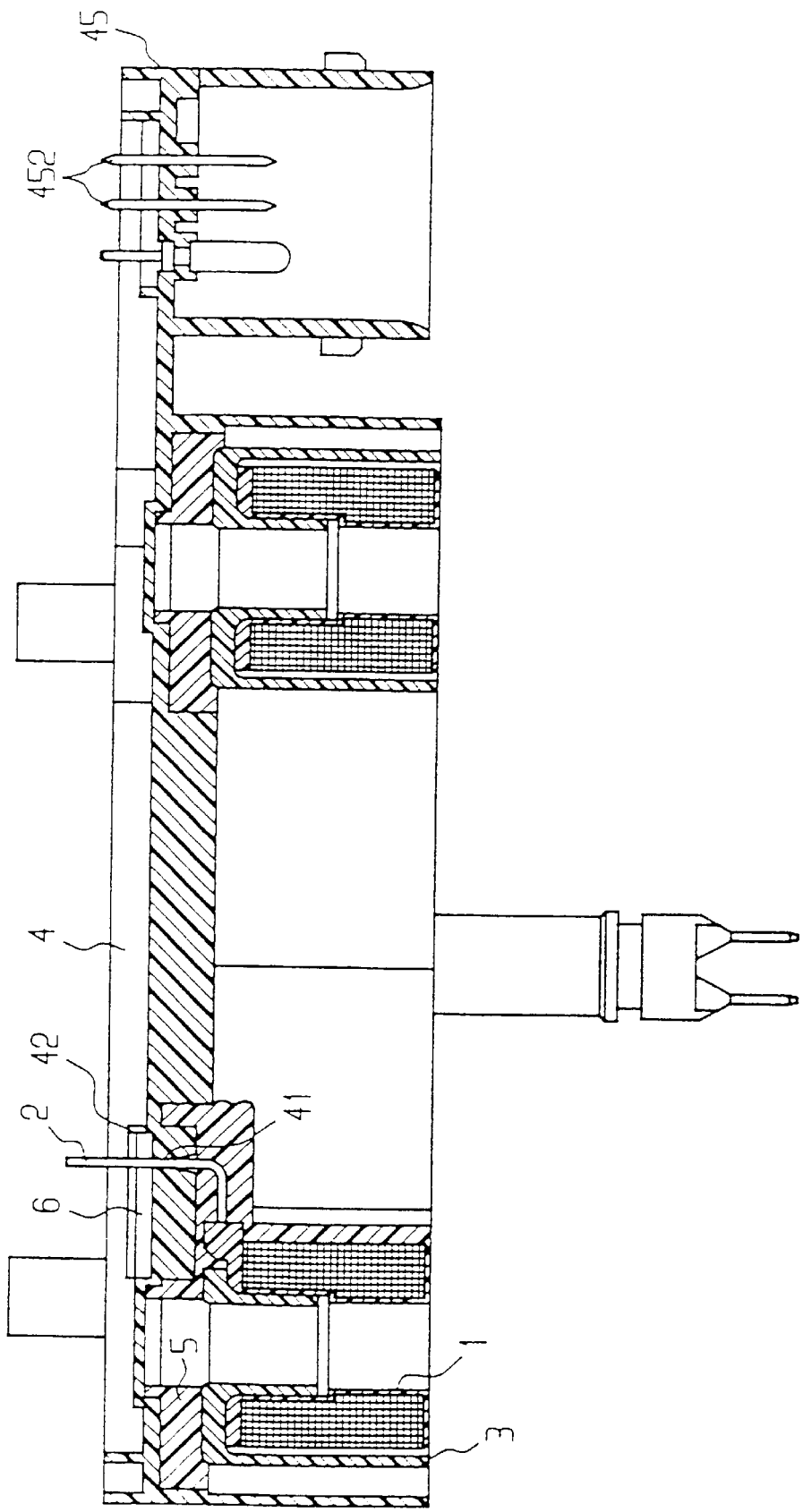

VALVE CONTROL DEVICE FOR CONTROLLING A VALVE FOR A PRESSURE FLUID

BACKGROUND OF THE INVENTION

FIELD OF THE INVENTION

The invention relates to a valve control device for controlling a valve for a pressure fluid, including a cylindrical coil with a longitudinal axis and a coil wire wound onto a coil body, coil terminal pins which are secured to a terminal pin carrier of the coil body disposed on an end surface of the coil and which are electrically conductively connected to the coil wire, a yoke ring housing which surrounds the coil and has an opening for a terminal of the coil, and a housing wall facing toward the end surface of the coil, on which the yoke ring housing is secured by a fastening element.

An example of such a valve control device is an electronic control unit for an anti-lock brake system (ABS) in a motor vehicle, in which brake fluid actuating wheel brakes is controlled with one or two valves per wheel. Each of the valves are actuated by a respective electromagnet.

A valve control device that is known from German Published, Non-Prosecuted Patent Application DE 42 32 205 A1 has a cylindrical coil which contains a coil wire wound onto a coil body. Coil terminal pins, which are disposed parallel to the longitudinal axis of the coil and are secured in a terminal pin carrier of the coil body disposed on an end surface of the coil, are electrically conductively connected to the coil wire. A yoke ring housing that surrounds the coil has an opening on its yoke ring bottom toward the end surface of the coil, for the coil terminal pins or the terminal pin carrier. The coil terminal pins protruding from the yoke ring housing are introduced into openings in a housing wall facing toward the end surface of the coil. The yoke ring housing is secured to the housing wall of the valve control device by an elastic fastening element, which also surrounds the coil terminal pins.

Such a valve control device has a great structural height in the direction of the legs of the coil, since on one hand the terminal pin carrier cannot be allowed to be less than a minimum structural height, otherwise the coil terminal pins could not be stably secured therein. On the other hand, a winding region of the terminal pins, which is defined by one turn of the coil wire around the terminal pins for producing an electrically conductive connection, has a negative effect on the structural height of the valve control device since the winding region is located outside the yoke ring housing and therefore increases the distance between the yoke ring housing or the terminal pin carrier and the housing wall.

In such a valve control device, the danger also exists of the coil wire, which is guided through an upper stop of the coil body and the terminal pin carrier to the winding region of the terminal pins, being stripped of its insulation by sharp edges of the opening in the yoke ring housing when the yoke ring housing is mounted on the coil, thus forming a short circuit between the yoke ring housing and the coil wire.

In a magnet valve which is known from German Published, Non-Prosecuted Patent Application DE 43 10 960 A1, the terminal pins are extended laterally out of the yoke ring housing through an opening in the yoke ring sheath surrounding the coil.

SUMMARY OF THE INVENTION

It is accordingly an object of the invention to provide a valve control device for controlling a valve for a pressure fluid, which overcomes the hereinafore-mentioned disadvantages of the heretofore-known devices of this general type, which has a low structural height and which is simple to manufacture.

With the foregoing and other objects in view there is provided, in accordance with the invention, a valve control device for controlling a valve for a pressure fluid, comprising a cylindrical coil having a longitudinal extent defining a longitudinal axis, an end surface, a coil body with a terminal pin carrier disposed on the end surface, and a coil wire wound onto the coil body; coil terminal pins oriented crosswise to the longitudinal axis of the coil, secured to the terminal pin carrier and electrically conductively connected to the coil wire; a yoke ring housing including a yoke ring sheath surrounding the longitudinal extent of the coil and having a longitudinal extent, the yoke ring sheath having an opening formed therein in the form of a gap piercing the full longitudinal extent of the yoke ring sheath for accommodating the terminal pin carrier, the coil wire and the terminal pins; a housing wall facing toward the end surface of the coil; and a fastening element securing the yoke ring housing on the housing wall.

According to the invention, the coil terminal pins are secured in the terminal pin carrier crosswise to the longitudinal axis of the coil. The terminal pin carrier can therefore be made shorter in its length along the longitudinal axis of the coil than if the coil terminal pins were disposed in the direction of the longitudinal axis of the coil, since according to the invention it is the crosswise extent of the terminal pin carrier that is definitive for stable reception of the coil terminal pins in the terminal pin carrier. However, a crosswise extent of the terminal pin carrier is not definitive for the structural height of the valve control device. Thus the structural height of the valve control device is reduced.

Additionally, the winding region of the terminal pins no longer involves any additional structural height: The yoke ring housing can be joined to the housing wall in the immediate vicinity thereof, by a fastening element.

The yoke ring housing contains a yoke ring sheath, which surrounds the coil in its longitudinal extent. The yoke ring sheath has the opening for one terminal of the coil. The terminal pins or the terminal pin carrier is then passed laterally through the opening out of the yoke ring housing.

The opening includes a gap that pierces the yoke ring sheath in its lengthwise extent. Thus the yoke ring housing can be thrust from above onto the coil and the terminal pins.

In accordance with another feature of the invention, the yoke ring housing has a yoke ring bottom facing toward the end surface of the coil, and the yoke ring bottom has a recess formed therein forming the opening together with the gap.

In accordance with a concomitant feature of the invention, the coil terminal pins are bent by approximately 90° and are guided through an opening formed in the housing wall, and the fastening element is elastic and surrounds at least portions of the coil terminal pins.

Other features which are considered as characteristic for the invention are set forth in the appended claims.

Although the invention is illustrated and described herein as embodied in a valve control device for controlling a valve for a pressure fluid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a side-elevational view of a valve control device of the invention.

DESCRIPTION OF THE PREFERRED EMBODIMENTS

Figure 1:
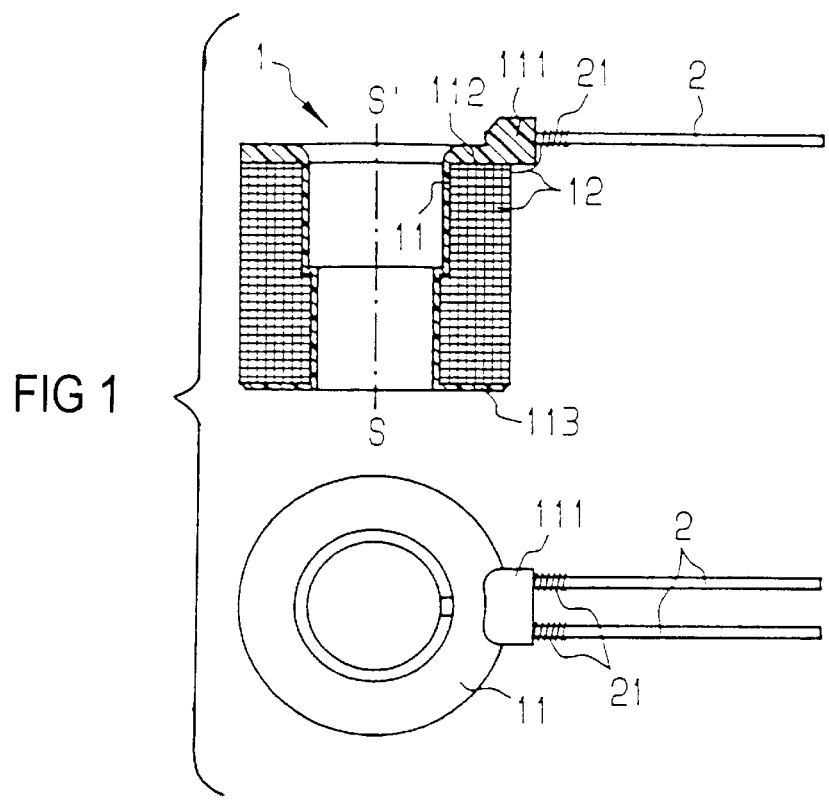
FIG. 1 includes diagrammatic, side-elevational and plan views of a coil according to the invention with coil terminal pins.

Referring now in detail to the figures of the drawings, in which identical elements of a valve control device have the same reference numerals, and first, particularly, to FIG. 1 thereof, there is seen a side view and a top-plan view of a coil 1 with a longitudinal axis S–S' and terminal pins 2. The coil 1 has a hollow-cylindrical coil body 11 with an upper stop 112, a lower stop 113 and a terminal pin carrier 111, as well as a coil wire 12 wound onto the coil carrier 1.

The terminal pins 2 are secured to the terminal pin carrier 111 by ultrasonic welding, injection or shot-in insertion and are oriented crosswise to the longitudinal axis S–S' of the coil. The terminal pin carrier 111 has an extent crosswise to the longitudinal axis S–S' of the coil that is large enough to ensure that the terminal pins 2 have a firm hold.

The coil wire 12 is stripped of its insulation on a first end by the action of heat or mechanical action and is wound onto a first one of the terminal pins 2 near the terminal pin carrier 111. This region will be referred to below as a winding region 21. The coil wire 12 is welded or soldered in the winding region 21 to the terminal pin 2, so that an electrically conductive connection exists between the terminal pin 2 and the coil wire 12. Then the coil wire 12 is guided through a non-illustrated guide groove in the terminal pin carrier 111 and over a non-illustrated hook on the upper stop 112 toward the coil body 11 and is wound around it in a plurality of turns toward the lower stop 113. The coil wire 12 is wound multiple times up and down the coil body 11 before a second end of the coil wire 12 is again guided over the hook and through the guide groove to a second one of the terminal pins 2, it is stripped of its insulation near the terminal pin carrier 111 and it is electrically conductively joined to the second terminal pin 2.

Figure 2:
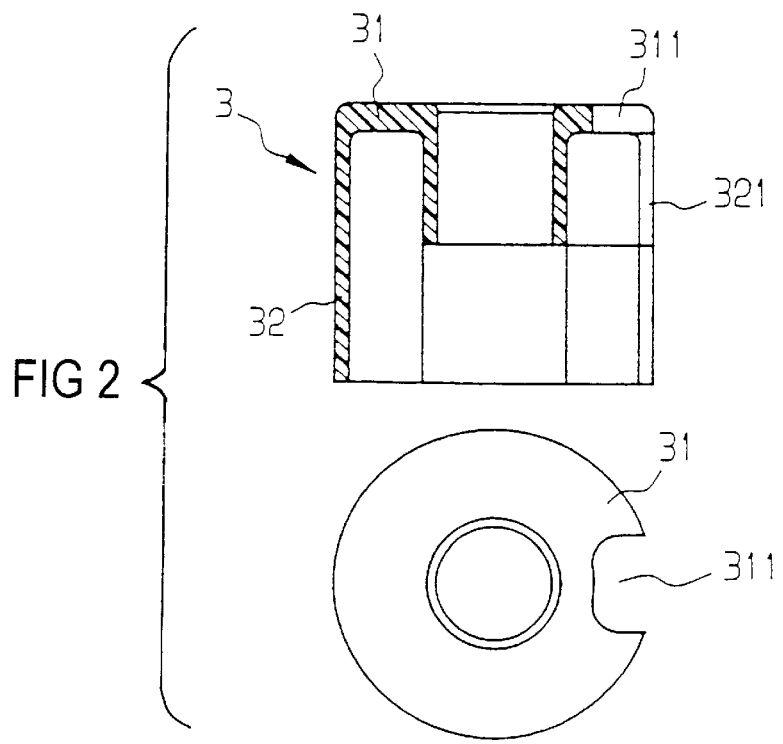
FIG. 2 includes side-elevational and plan views of a yoke ring housing of the invention.

FIG. 2 shows a yoke ring housing 3 according to the invention in a side view and a top-plan view, with a yoke ring bottom 31 and a yoke ring sheath 32. The yoke ring housing 3 has an opening or break-through, which includes a recess 311 in the yoke ring bottom 31 and a gap 321 in the yoke ring sheath 32. The gap 321 is constructed in such a way that it pierces the yoke ring sheath 32 through its entire longitudinal extent. Thus the yoke ring housing 3 can be thrust from above over the coil 1 and the terminal pins 2.

Figure 3:
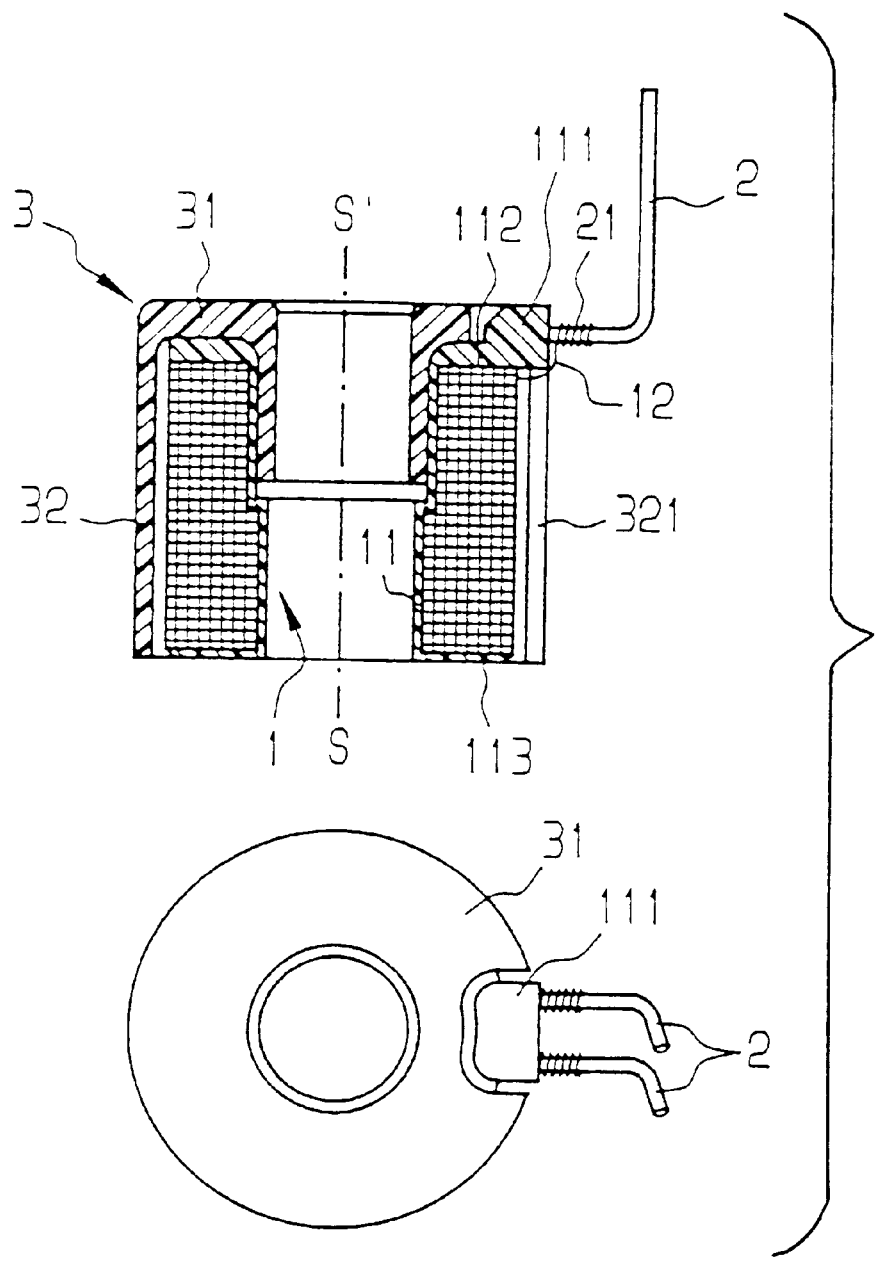
FIG. 3 includes side-elevational and plan views of the yoke ring housing of the invention as shown in FIG. 2, combined with the coil with terminal pins of FIG. 1.

FIG. 3 shows the coil 1 with its terminal pins 2 of FIG. 1, which is surrounded by the yoke ring housing 3 of FIG. 2. The terminal pin carrier 111 is disposed in the opening of the yoke ring housing 3. The gap 321 of the yoke ring sheath 32 allows the yoke ring housing 3 to be slipped onto the coil 1, especially onto the terminal pin carrier 111 with the terminal pins 2. If the opening also includes the recess 311 in the yoke ring bottom 31, then the structural height of the valve control device is further reduced, since the recess 311 is simultaneously used as space for the terminal pin carrier 111. However, an embodiment is also conceivable in which the yoke ring bottom 31 has no recess 311.

When the yoke ring housing 3 is mounted on the coil 1, the danger no longer exists that sharp edges of the opening in the yoke ring housing 3 will strip the insulation of the coil wire 12 along its guidance through the hooks and guide groove to the terminal pins 2, thus making a short circuit between the yoke ring housing and the coil wire.

Moreover, the coil wire 12 can be wound as far as an outer end of the stops 112 and 113 of the coil body 11. This is possible because the hooks that fix the coil wire 12 in its guidance to the terminal pins 2, which until now have been disposed inside the yoke ring housing 3 on the upper stop 112 of the coil body 11 and have prevented the coil wire 12 from being wound as far as the ends of the stops 112 and 113, are still disposed on the coil body 11, but outside the yoke ring housing 3, according to the invention. The spacing between the coil winding and the yoke ring sheath 32 can thus be kept minimal, which means that for the same extent of the yoke ring housing 3, more turns can be wound onto the coil body 11 with the invention. Despite the greater number of winding turns, because of a requisite extent of the yoke ring housing 3, a magnetic flux that is induced by the coil through which current flows into the yoke ring housing 3, is not reduced.

The terminal pins 2 are aligned in such a way that they are disposed in the direction of centrifugal force acting on the coil 1 when the coil wire 12 is wound onto the coil body 11. Therefore, they cannot become bent in the winding process from the centrifugal force acting upon them.

The length of the coil wire 12 from beyond the coil winding to the winding portion 21 of the terminal pins 2 is also very short.

FIG. 4 shows a valve control device in which the yoke ring housing 3 is secured with the coil 1 and the terminal pins 2 of FIG. 3 to a lower surface or underside of a housing wall 4 of the valve control device by a fastening element 5. In this case the terminal pins 2 are bent at an angle of about 90° and are guided through openings 41 in the housing wall 4. The fastening element 5 is constructed as elastic casting composition, for instance of thermoplastic synthetic. The fastening element 5 not only secures the yoke ring housing 3 to the housing wall 4 but also surrounds the terminal pins 2. In the same step in which the fastening element 5 is formed on by injection molding, a hollow space between the coil 1 and the yoke ring housing 3 is also filled by injection molding. This elastic casting composition between the coil 1 and the yoke ring housing 3 predominantly serves to protect the coil 1 against external influences, to separate the potential of the coil 1 and the yoke ring housing 3, and to secure the coil 1 in the yoke ring housing 3. The elastic casting composition between the yoke ring housing 3 and the housing wall 4 serves predominantly to support the yoke ring housing 3 elastically in all three directions in space, and to protect the terminal pins 2 against external influences. The resilient support of the yoke ring housing 3 on the housing 4 is necessary, above all, whenever yoke ring housings 3 in a valve control device having a plurality of valves, are mounted with associated coils 1 on valve domes of the valves.

The embodiment of the valve control device according to the invention has the further advantage of ensuring a resilient support of the yoke ring housing 3 even in the direction of the longitudinal axis S–S' of the coil, because of the fact that the terminal pins 2 emerge laterally from the terminal pin carrier 111 and are bent toward the housing wall 4.

Figure 5A:
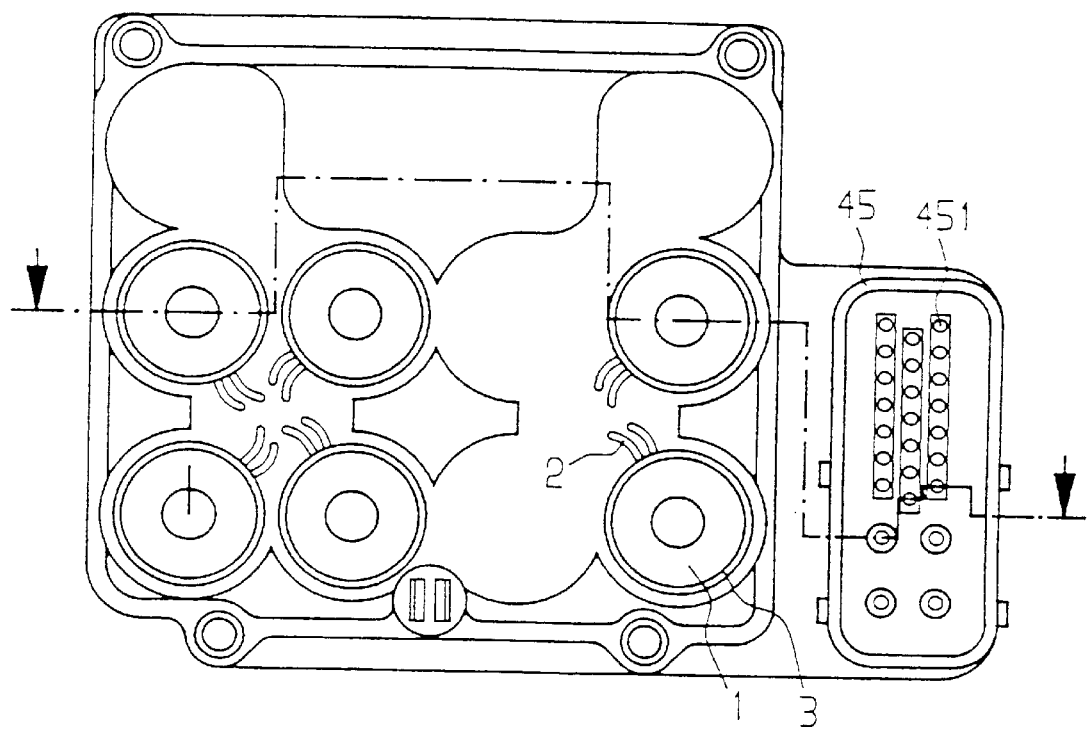
FIGS. 5a and 5b are respective bottom-plan and top-plan views of the valve control device of FIG. 4.
Figure 5B:
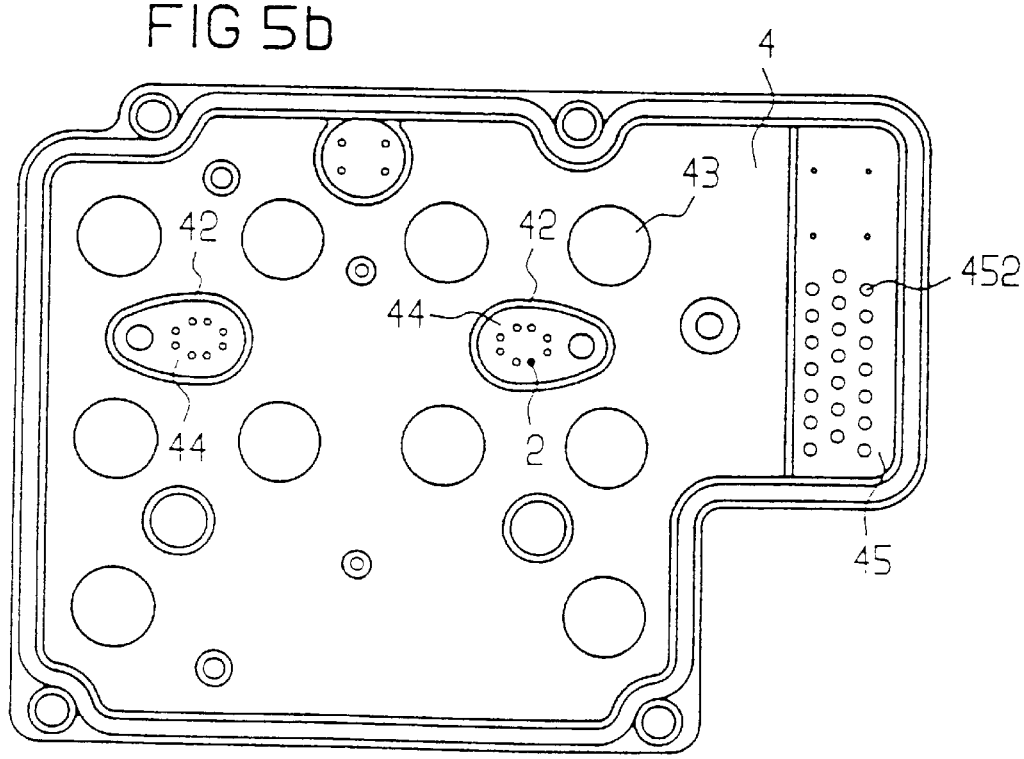

In a region 42, in which the terminal pins 2 emerge from the openings 41 on the upper surface of the housing wall, there is a sealing element 44 shown in FIG. 5b, in the form of a further casting composition, which prevents any penetration of moisture from the underside of the housing wall 4 into the housing interior of the valve control device through capillaries of the terminal pins 2. The housing interior of the valve control device is defined by the upper surface of the housing wall 4.

The housing wall 4 may also include a plug part 45 which, for instance, has male multipoint connectors 451 shown in FIG. 5a for plug terminal pins 452.

FIGS. 5a and 5b respectively show the valve control device of FIG. 4 in a plan view from below and a further plan view from above. In the plan view from above, the regions 42 can be seen in which the terminal pins 2 pass through the housing wall 4. These regions also have the sealing elements 44. A printed circuit board, for instance, is placed on bearings 43 of the housing wall 4, and both the terminal pins 2 and the plug terminal pins 452 are welded or soldered thereto. The printed circuit board carries an electrical circuit, such as a control circuit for an anti-lock brake system (ABS) of a motor vehicle. The bottom-plan view of the housing wall 4 shows the coils 1, the yoke ring housings 3 and the coil terminal pins 2.

I claim:

1. A valve control device for controlling a valve for a pressure fluid, comprising:
   a cylindrical coil having a longitudinal extent defining a longitudinal axis, an end surface, a coil body, a terminal pin carrier monolithically formed together with said coil body and disposed on said end surface, and a coil wire wound onto said coil body;
   coil terminal pins oriented crosswise to said longitudinal axis of said coil, secured to said terminal pin carrier and electrically conductively connected to said coil wire;
   a yoke ring housing including a yoke ring sheath surrounding said longitudinal extent of said coil, having a longitudinal extent, and a yoke ring bottom integrally formed with said yoke ring sheath, said yoke ring housing having an opening formed therein for accommodating said terminal pin carrier, said coil wire and said terminal pins, said opening including a gap formed along all of said longitudinal extent of said yoke ring sheath and a recess formed in said yoke ring bottom contiguous with said gap in said yoke ring sheath;
   a housing wall facing toward said end surface of said coil; and
   a fastening element securing said yoke ring housing on said housing wall.

2. The valve control device according to claim 1, including a fastening element disposed between said housing wall and said yoke ring housing and securing said yoke ring housings to said common housing.

3. A valve control device for controlling at least one valve for a pressure fluid, comprising:
   a plurality of cylindrical coils each having a longitudinal extent defining a longitudinal axis, an end surface, a coil body with a terminal pin carrier monolithically formed together with said coil body and disposed on said end surface, and a coil wire wound onto said coil body;
   coil terminal pins oriented crosswise to said longitudinal axis of each of said coils, secured to said terminal pin carrier and electrically conductively connected to said coil wire;
   yoke ring housings each including a yoke ring sheath surrounding said longitudinal extent of a respective one of said coils, having a longitudinal extent, and a yoke ring bottom integral with said yoke ring sheath, said yoke ring sheath having an opening formed therein in the form of a gap piercing all of said longitudinal extent of said yoke ring sheath and a recess formed in said yoke ring bottom for accommodating said terminal pin carrier, said coil wire and said terminal pins;
   a common housing receiving and housing said yoke ring housings surrounding said coils and having a housing wall facing toward and securing said yoke ring housings in said common housing.

4. The valve control device according to claim 3, wherein said coil terminal pins are bent by approximately 90° and are guided through an opening formed in said common housing.

5. The valve control device according to claim 3, including a fastening element disposed between said housing wall and each of said yoke ring housings and securing said yoke ring housings to said common housing.

6. The valve control device according to claim 5, wherein said fastening element is elastic and surrounds at least portions of said coil terminal pins.

7. A valve control device for controlling a plurality of valves, comprising:
   a plurality of cylindrical coils each having a longitudinal extent defining a longitudinal axis, an end surface, a coil body formed with a hollow interior, a terminal pin carrier monolithically formed together with said coil body and disposed on said end surface, and a coil wire wound onto said coil body; coil terminal pins oriented crosswise to said longitudinal axis of each of said coils, secured to said terminal pin carrier and electrically conductively connected to said coil wire;
   yoke ring housings each including a yoke ring sheath surrounding said longitudinal extent of a respective one of said coils, having a longitudinal extent, and a yoke ring bottom integral with said yoke ring sheath, said yoke ring sheath having a gap formed therein piercing all of said longitudinal extent of said yoke ring sheath and said yoke ring bottom having a recess formed therein continuous with said gap in said yoke ring sheath, said gap and said recess together defining an opening accommodating said terminal pin carrier, said coil wire and said terminal pins;
   a common housing receiving and housing said yoke ring housings surrounding said coils, said common housing having a housing bottom wall facing toward and securing said yoke ring housings in said common housing, and said housing exposing said hollow interiors in said coil bodies towards an exterior of said common housing.

8. The valve control device according to claim 7, including a fastening element disposed between said housing bottom wall and each of said yoke ring housings and securing said yoke ring housings to said common housing.

* * * * *